(12) United States Patent
Amitai

(10) Patent No.: US 7,643,214 B2
(45) Date of Patent: Jan. 5, 2010

(54) SUBSTRATE-GUIDED OPTICAL DEVICE WITH WIDE APERTURE

(75) Inventor: Yaakov Amitai, Rehovot (IL)

(73) Assignee: Lumus Ltd., Rehovot (IL)

( * ) Notice: Subject to any disclaimer, the term of this patent is extended or adjusted under 35 U.S.C. 154(b) by 62 days.

(21) Appl. No.: 11/570,587

(22) PCT Filed: Jun. 16, 2005

(86) PCT No.: PCT/IL2005/000637

§ 371 (c)(1),
(2), (4) Date: Dec. 27, 2007

(87) PCT Pub. No.: WO2005/124428

PCT Pub. Date: Dec. 29, 2005

(65) Prior Publication Data

US 2008/0198471 A1    Aug. 21, 2008

(30) Foreign Application Priority Data

Jun. 17, 2004    (IL) .................................... 162573

(51) Int. Cl.
*G02B 27/14* (2006.01)
*G02B 27/10* (2006.01)
(52) U.S. Cl. .................. 359/630; 359/629; 359/618
(58) Field of Classification Search ............... 359/298, 359/618, 619, 621, 629–634; 362/245, 19, 362/297, 328, 331, 561; 349/62, 64, 65
See application file for complete search history.

(56) References Cited

U.S. PATENT DOCUMENTS

| | | | |
|---|---|---|---|
| 3,737,212 A * | 6/1973 | Antonson et al. | 359/14 |
| 3,940,204 A * | 2/1976 | Withrington | 359/19 |
| 4,309,070 A | 1/1982 | St. Leger Searle | 345/7 |
| 6,829,095 B2 * | 12/2004 | Amitai | 359/630 |

FOREIGN PATENT DOCUMENTS

| | | |
|---|---|---|
| EP | 1 158 336 | 11/2001 |
| WO | WO 95/10106 | 4/1995 |
| WO | WO 01/95027 | 12/2001 |
| WO | WO 02/082168 | 10/2002 |
| WO | WO 03/081320 | 10/2003 |

* cited by examiner

*Primary Examiner*—Mohammed Hasan

(57) ABSTRACT

There is provided an optical device, having a light transmitting substrate (20) including at least two major surfaces parallel to each other and edges; optical means (16) for coupling light into the substrate by internal reflection and at least one reflecting, surface (22) located in the substrate which is non-parallel to the major surfaces of the substrate (20) characterized in that the optical means (16) for coupling light into the substrate is a partially reflecting surface, wherein part of the light coupled into the substrate (20) passes through the partially reflecting surface (16) out of the substrate and part of the light is reflected into the substrate (20).

39 Claims, 10 Drawing Sheets

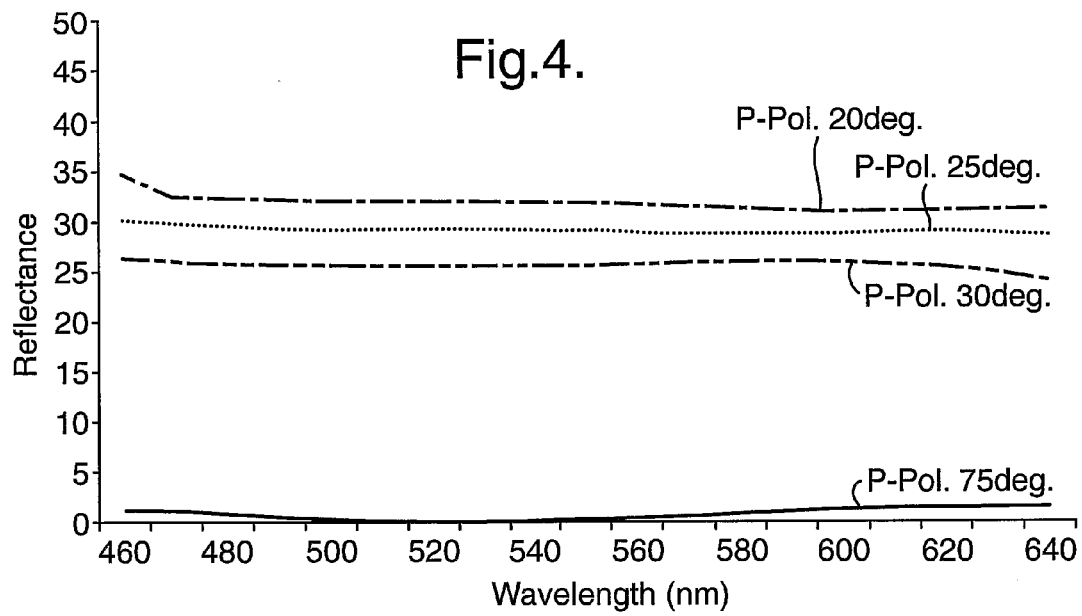
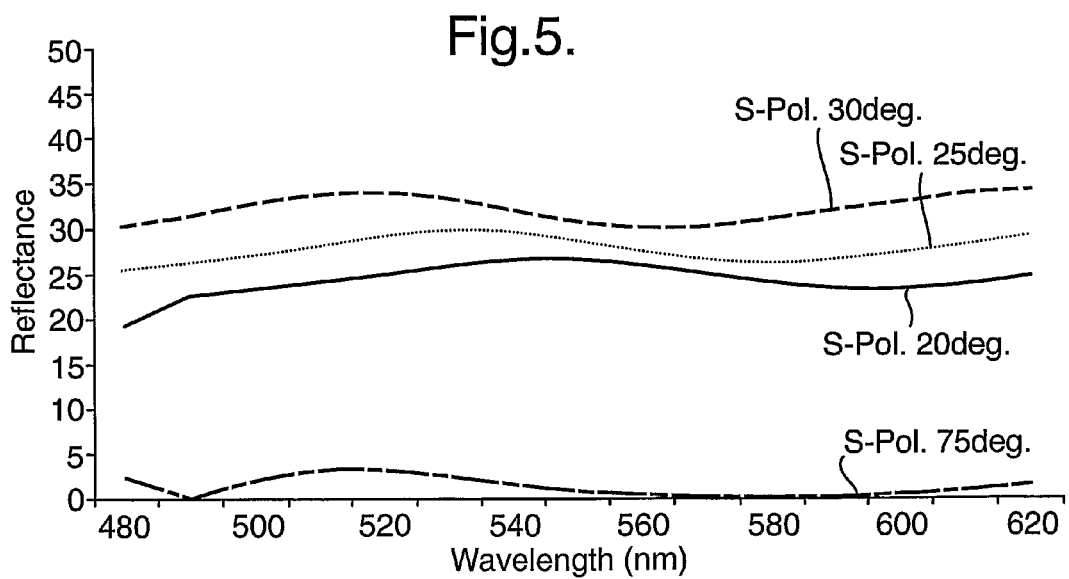

SUBSTRATE-GUIDED OPTICAL DEVICE WITH WIDE APERTURE

FIELD OF THE INVENTION

The present invention relates to substrate-guided optical devices, in general, and to devices which include a plurality of reflecting surfaces carried by common light-transmissive substrates, in particular, also referred to as light-guides.

The invention can be implemented to advantage in a large number of imaging applications, such as head-mounted and head-up displays, and cellular phones.

BACKGROUND OF THE INVENTION

One of the important applications for compact optical elements is with head-mounted displays (HMD), in which an optical module serves as both an imaging lens and a combiner, whereby a two-dimensional display is imaged to infinity and reflected into the eye of an observer. The display can be obtained directly from either a spatial light modulator (SLM) such as a cathode ray tube (CRT), a liquid crystal display (LCD), an organic light emitting diode array (OLED), a scanning source or similar devices, or indirectly, by means of a relay lens or an optical fiber bundle. The display comprises an array of elements (pixels) imaged to infinity by a collimating lens and transmitted into the eye of the viewer by means of a reflecting, or partially reflecting, surface acting as a combiner for non-see-through or see-through applications, respectively. Typically, a conventional, free-space optical module is used for this purpose. As the desired field-of-view (FOV) of the system increases, such a conventional optical module necessarily becomes larger, heavier, and bulkier, rendering the device impractical, even for moderate performance. These are major drawbacks for all kinds of displays, but especially so for head-mounted applications wherein the systems must necessarily be as light and as compact as possible.

The strive for compactness has led to several different complex optical solutions, all of which, on one hand, are still not sufficiently compact for most practical applications, and on the other hand, are difficult to manufacture. Furthermore, the eye-motion-box (EMB) of the optical viewing angles resulting from these designs is usually very small—typically less than 8 mm. Hence, the performance of the optical systems are very sensitive even to small movements relative to the eye of the viewer, and do not allow sufficient pupil motion for convenient reading of a displayed text.

DISCLOSURE OF THE INVENTION

The present invention facilitates the design and fabrication of very compact light-guide optical elements (LOEs) for, among other applications, HMDs and allows relatively wide FOVs, together with relatively large EMB sizes. The resulting optical system offers a large, high-quality image, which also accommodates large movements of the eye. The optical system offered by the present invention is particularly advantageous as it is significantly more compact than state-of-the-art implementations, and yet, can be readily incorporated even into optical systems having specialized configurations.

The invention also enables the construction of improved head-up displays (HUDs). Since the inception of such displays more than three decades ago, there has been significant progress in the field. Indeed, HUDs have become popular, and they now play an important role, not only in most modern combat aircraft, but also in civilian aircraft in which HUD systems have become a key component for low-visibility landing operation. Furthermore, there have recently been numerous proposals and designs for HUDs in automotive applications in which they can potentially assist the driver in driving and navigation tasks. State-of-the-art HUDs, nevertheless, suffer several significant drawbacks. All HUDs of the current designs require a display source that must be located a significant distance away from the combiner, in order to ensure that the source illuminates the entire combiner surface. As a result, the combiner-projector HUD system is necessarily bulky and large, thus requiring considerable installation space. This renders installation inconvenient, and its use, even unsafe at times. The large optical apertures in conventional HUDs also pose a significant optical design challenge, whereby cost is high or performance is compromised. The chromatic dispersion of high-quality holographic HUDs is of particular concern.

An application of the present invention relating to its implementation in a compact HUD, alleviates the aforementioned drawbacks. In the HUD design of the current invention, the combiner is illuminated with a compact display source that can be attached to the substrate. Hence, the overall system is very compact and can be readily installed in a variety of configurations for a wide range of applications. In addition, the chromatic dispersion of the display is negligible and, as such, can operate with wide spectral sources, including conventional white-light. In addition, the present invention expands the image such that the active area of the combiner is much larger than the area actually illuminated by the light source.

A further application of the present invention is to provide a compact display with a wide FOV for mobile, hand-held application such as cellular phones. In today's wireless internet-access market, sufficient bandwidth is available for full video transmission. The limiting factor remains the quality of the display achieved in the device of the end-user. The mobility requirement restricts the physical size of the displays and the result is the direct-display demonstrating poor image viewing quality. The present invention enables a physically very compact display with a very large virtual image. This is a key feature in mobile communications, especially for mobile Internet access, solving one of the main limitations for its practical implementation. The present invention thereby enables the viewing of the digital content of a full format Internet page within a small, hand-held device, such as a cellular phone.

It is therefore a broad object of the present invention to alleviate the drawbacks of state-of-the-art compact optical display devices and to provide other optical components and systems having improved performance, according to specific requirements.

The invention therefore provides an optical device, comprising a light-transmitting substrate having at least two major surfaces parallel to each other and edges; optical means for coupling light into said substrate by internal reflection, and at least one reflecting surface located in said substrate which is non-parallel to said major surfaces of the substrate, characterized in that said optical means for coupling light into said substrate is a partially reflecting surface, wherein part of the light coupled into the substrate passes through the partially reflecting surface out of said substrate and part of said light is reflected into the substrate.

BRIEF DESCRIPTION OF THE DRAWINGS

The invention is described in connection with certain preferred embodiments, with reference to the following illustrative figures, so that it may be more fully understood.

With specific reference to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings are to serve as a direction to those skilled in the art as to how the several forms of the invention may be embodied in practice.

In the drawings:

FIG. 1 is a side view of a prior art folding optical device;

FIG. 2 is a side view of an exemplary light-guide optical element, in accordance with the present invention;

FIGS. 3A and 3B illustrate the desired reflectance and transmittance characteristics of selectively reflecting surfaces used in the present invention, for two ranges of incident angles;

FIG. 4 illustrates the reflectance curves as a function of wavelength for an exemplary dichroic coating for P-polarization;

FIG. 5 illustrates a reflectance curve as a function of wavelength for an exemplary dichroic coating for S-polarization;

FIG. 6 illustrates the reflectance curves as a function of incident angle for an exemplary dichroic coating;

FIG. 7 is a schematic sectional-view of a reflective surface, according to the present invention;

FIG. 8 is a diagram illustrating an exemplary configuration of a light-guide optical element, in accordance with the present invention;

FIG. 9 is a diagram illustrating another configuration of a light-guide optical element, in accordance with the present invention;

FIG. 10 is a diagram illustrating detailed sectional views of another configuration of an LOE having a symmetrical structure;

FIG. 11 illustrates detailed sectional views of the reflectance from an exemplary array of selectively reflective surfaces, for three different viewing angles;

Figure 12:
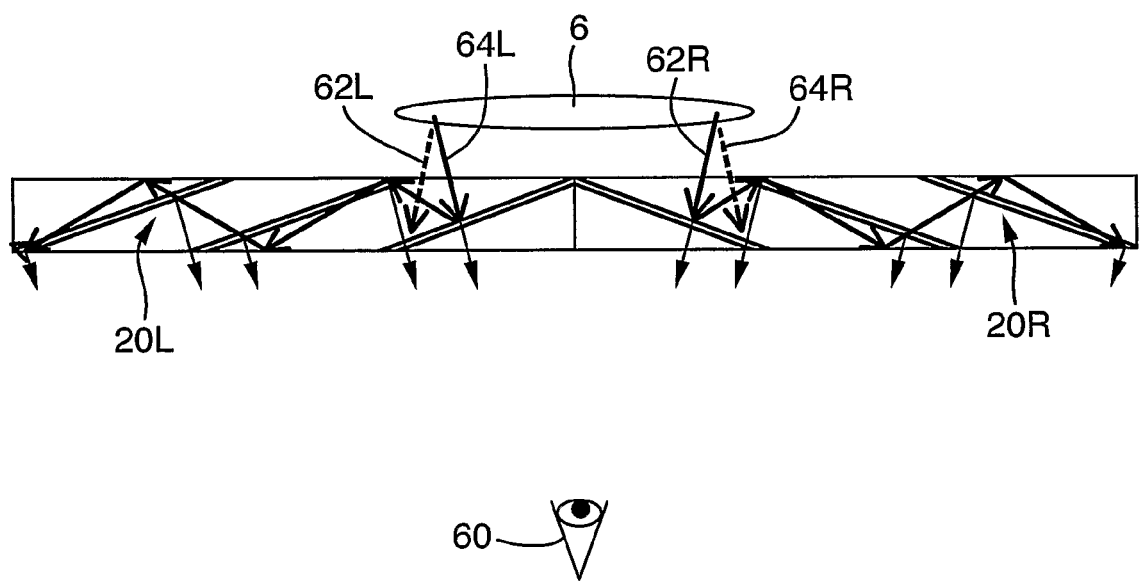
Figure 13:
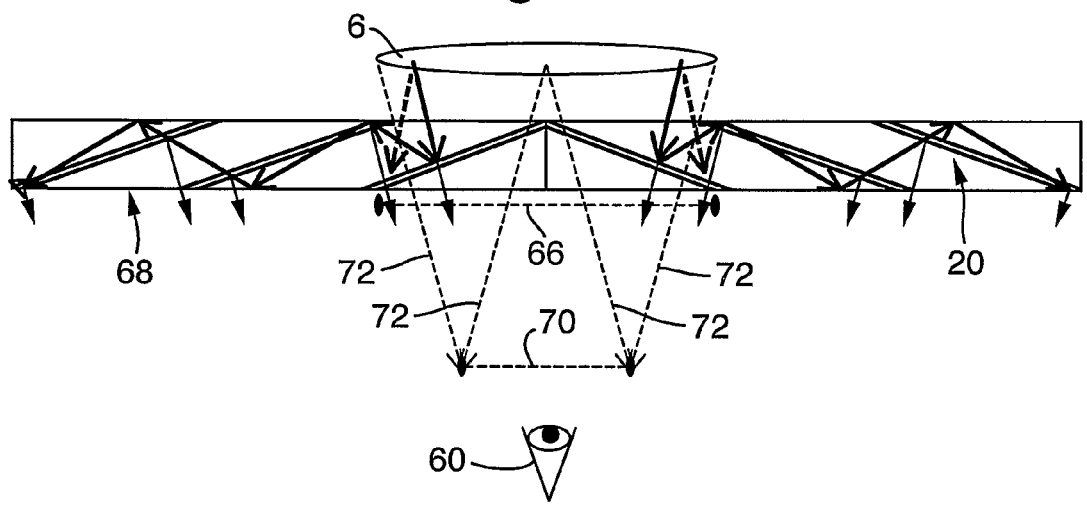
Figure 14:
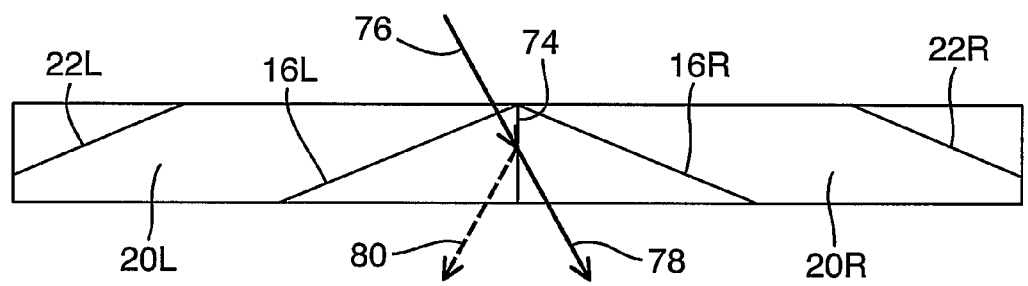
Figure 15:
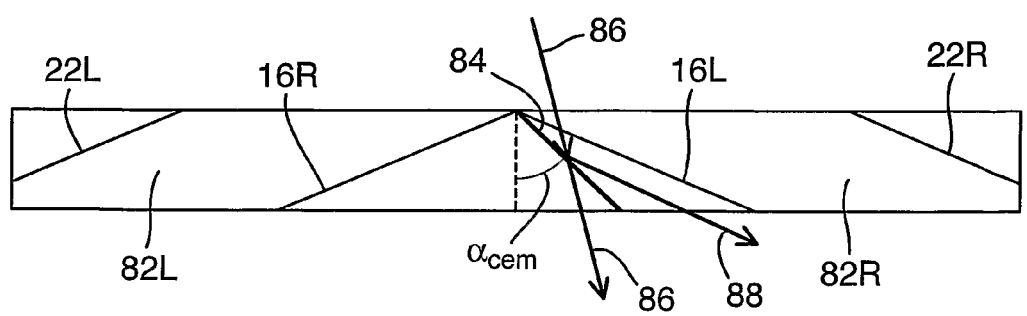
Figure 16:
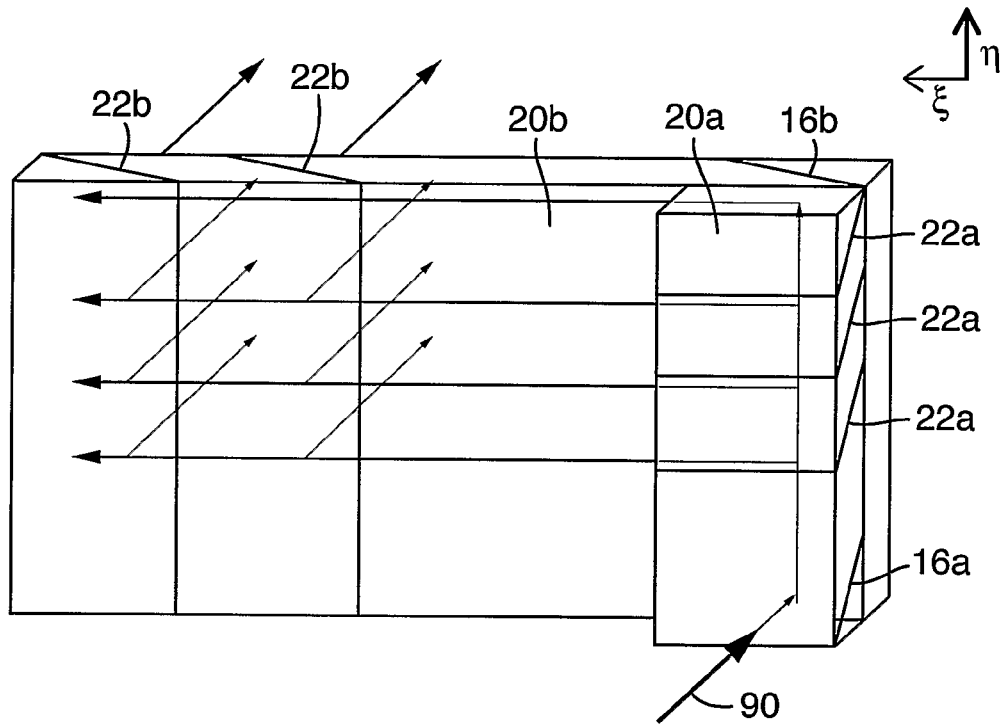
Figure 17:
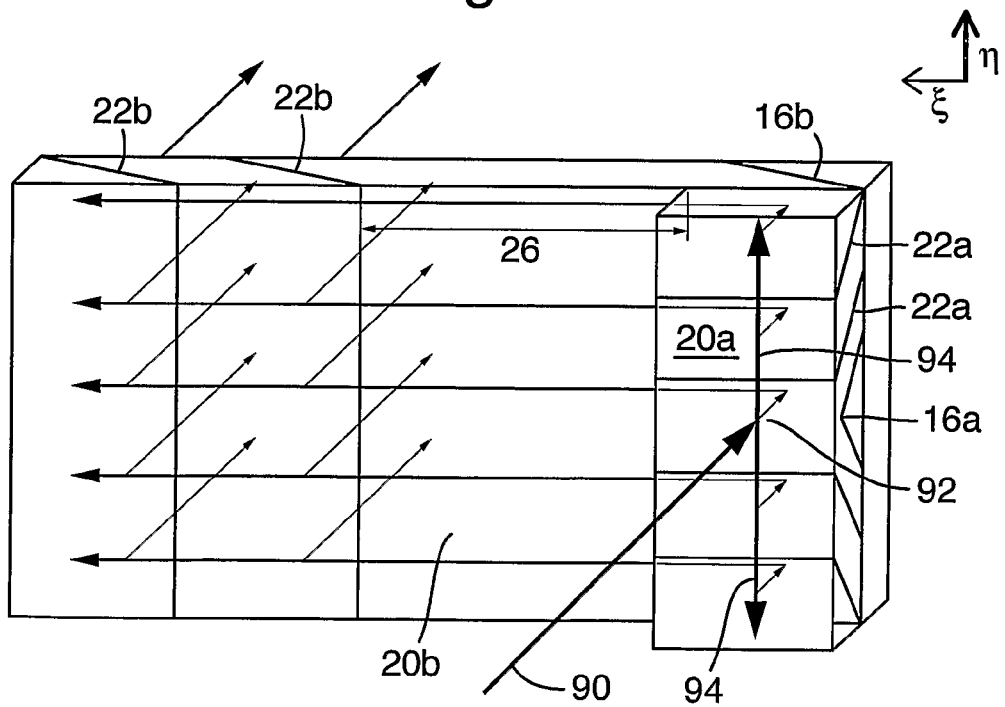
Figure 18:
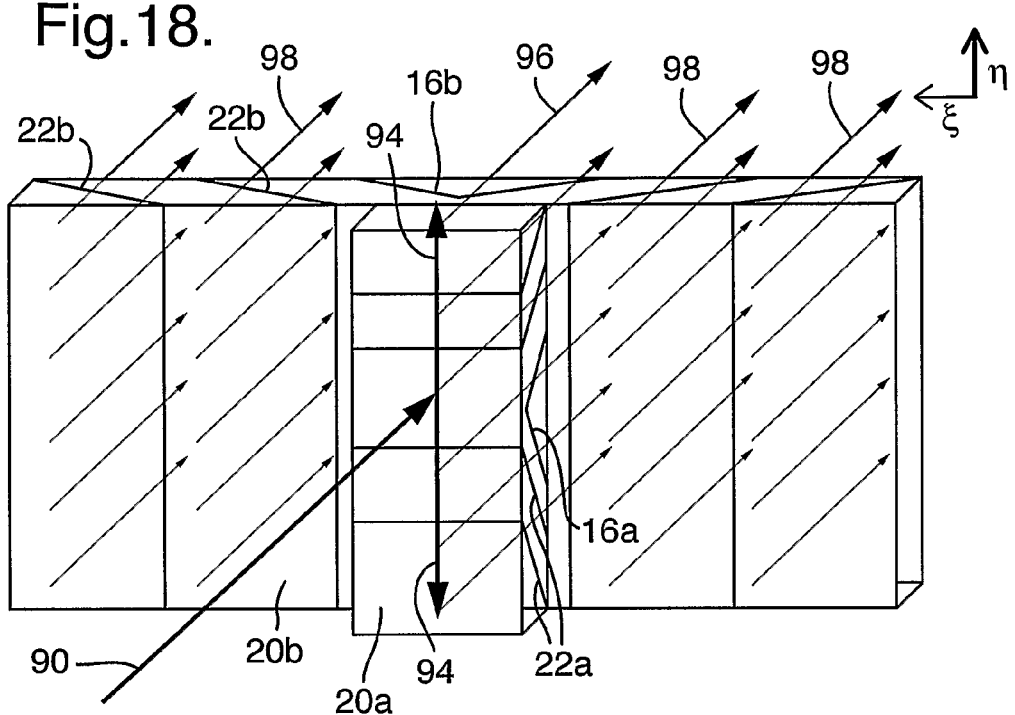
Figure 19:
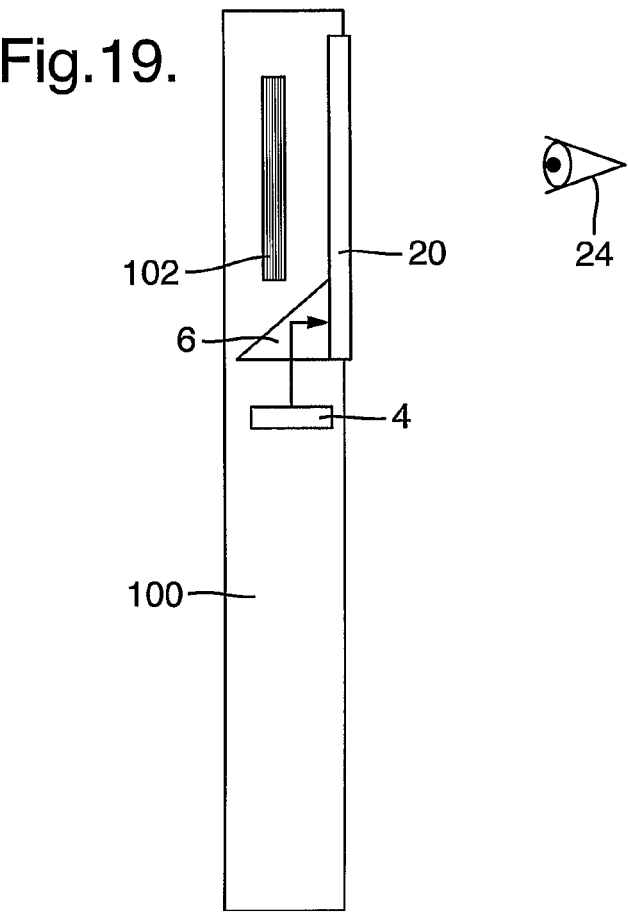
Figure 20:
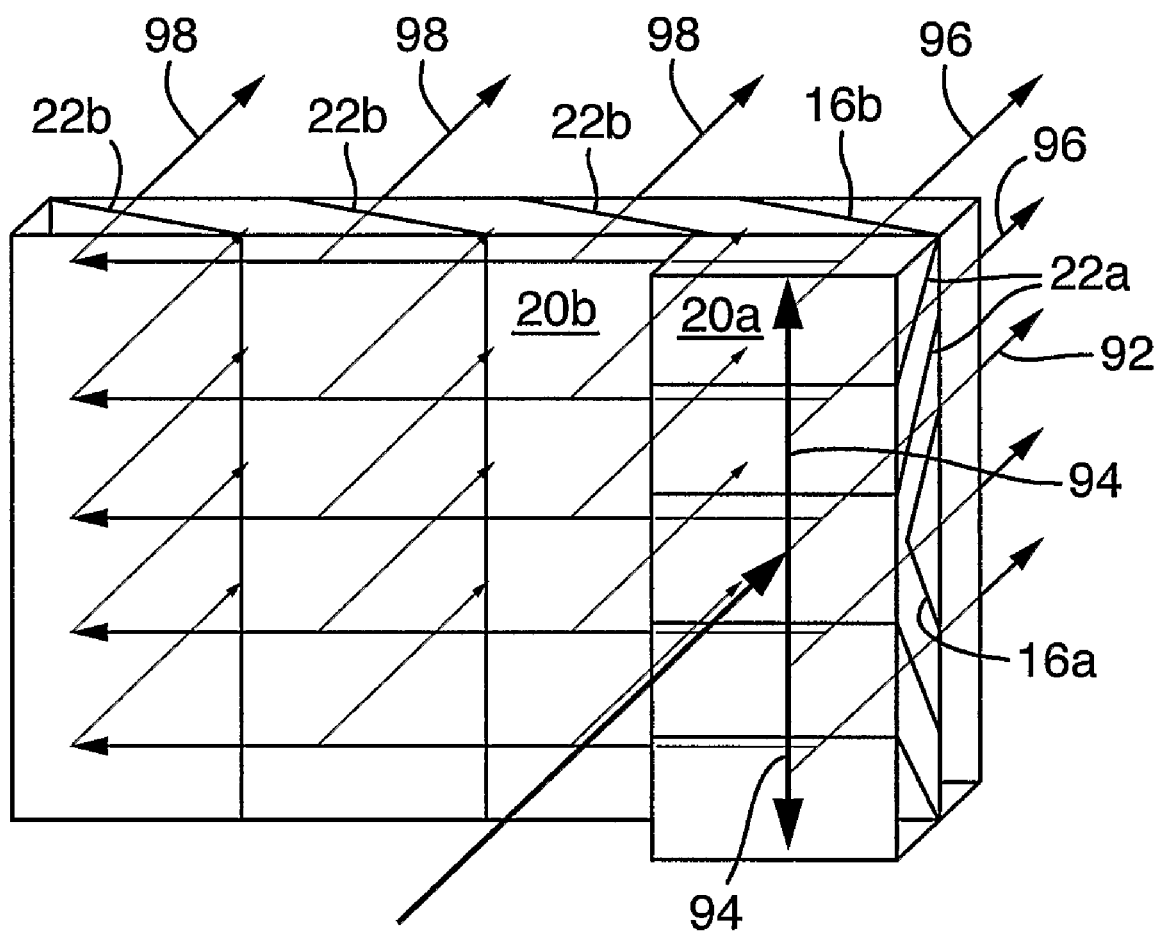
Figure 21:
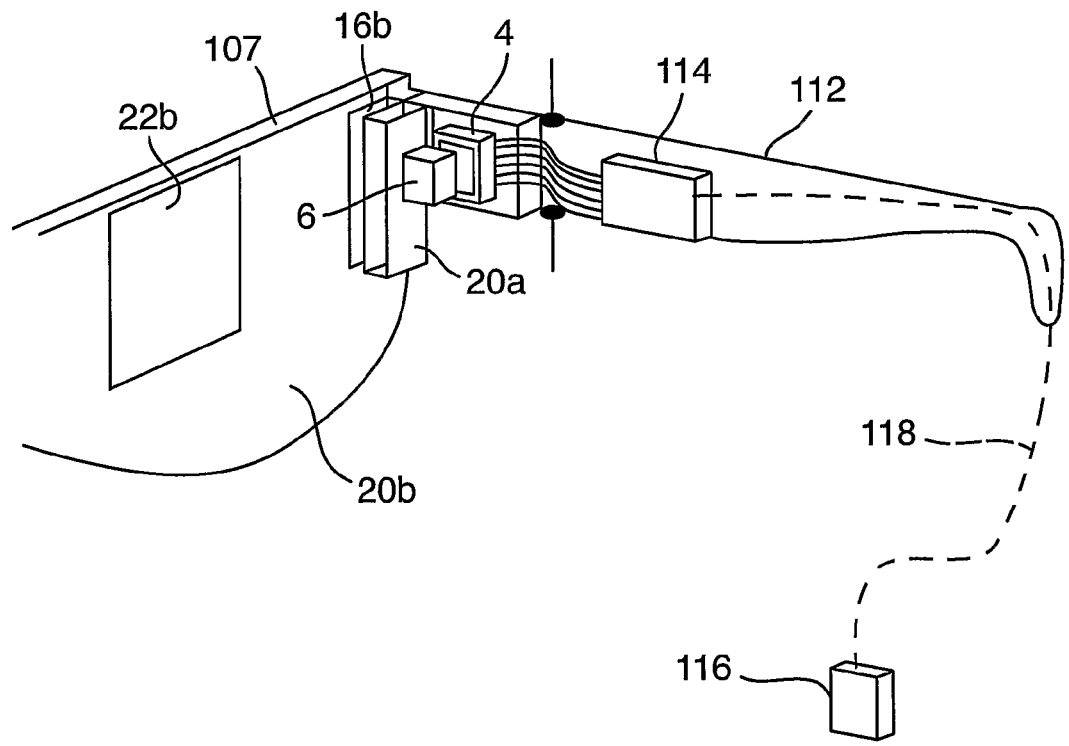
Figure 22:
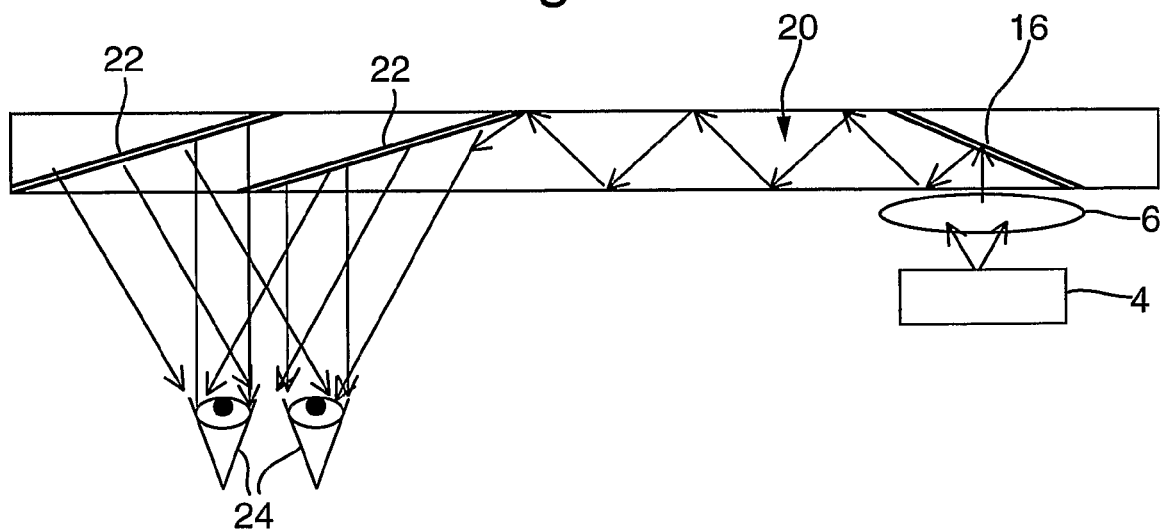

FIG. 12 is another diagram illustrating detailed sectional views of a symmetrical LOE configuration;

FIG. 13 is a diagram illustrating detailed sectional views of a symmetrical LOE configuration having a collimating lens with a reduced exit pupil;

FIG. 14 is a diagram illustrating a symmetrical LOE embodiment constructed of two identical parts;

FIG. 15 is a diagram illustrating a symmetrical LOE embodiment constructed of two different parts;

FIG. 16 is a diagram illustrating a method to expand a beam along two axes utilizing a double LOE configuration;

FIG. 17 is a diagram illustrating another method to expand a beam along two axes utilizing a double LOE configuration;

FIG. 18 is a diagram illustrating a further method to expand a beam along two axes utilizing a double LOE configuration;

FIG. 19 illustrates an embodiment of the present invention utilized in a cellular phone;

FIG. 20 is a diagram illustrating a still further method to expand a beam along two axes utilizing a double LOE configuration;

FIG. 21 illustrates an exemplary embodiment of the present invention embedded in a standard eyeglasses frame, and FIG. 22 illustrates an exemplary HUD system, in accordance with the present invention;

DETAILED DESCRIPTION OF PREFERRED EMBODIMENTS

Figure 1:
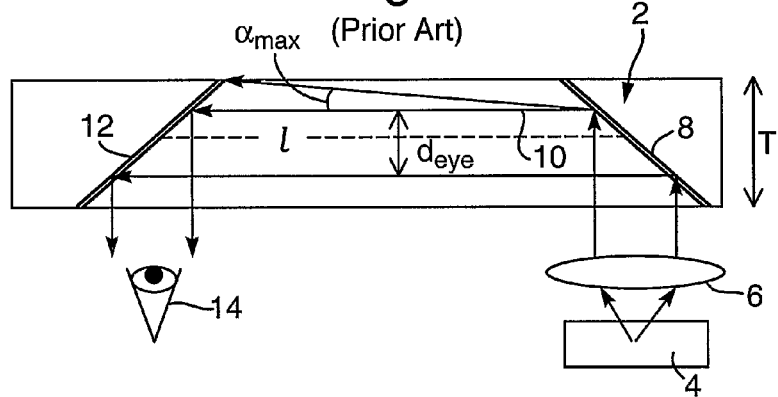

FIG. 1 illustrates a conventional prior art folding optics arrangement, wherein the substrate 2 is illuminated by a display source 4. The display is collimated by a collimating optics 6, e.g., a lens. The light from the display source 4 is coupled into substrate 2 by a first reflecting surface 8, in such a way that the main ray 10 is parallel to the substrate plane. A second reflecting surface 12 couples the light out of the substrate and into the eye of a viewer 14. Despite the compactness of this configuration, it suffers significant drawbacks. In particular, only a very limited FOV can be achieved. As shown in FIG. 1, the maximum allowed off-axis angle $\alpha_{max}$ inside the substrate is:

$$\alpha_{max} = \arctan\left(\frac{T - d_{eye}}{2l}\right), \quad (1)$$

wherein T is the substrate thickness;

$d_{eye}$ is the desired exit-pupil diameter, and l is the distance between reflecting surfaces 8 and 12.

With angles higher than $\alpha_{max}$, the rays are reflected from the substrate surface before arriving at the reflecting surface 12. Hence, the reflecting surface 12 will be illuminated at an undesired direction and ghost images appear.

Therefore, the maximum achievable FOV with this configuration is:

$$FOV_{max} \approx 2v\alpha_{max}, \quad (2)$$

wherein v is the refractive index of the substrate.

Typically the refractive index values lie in the range of 1.5-1.6.

Commonly, the diameter of the eye pupil is 2-6 mm. To accommodate movement or misalignment of the display, a larger exit-pupil diameter is necessary. Taking the minimum desirable value at approximately 8-10 mm, the distance between the optical axis of the eye and the side of the head, l, is typically between 40 and 80 mm. Consequently, even for a small FOV of 8°, the desired substrate thickness would be of the order of 12 mm.

Methods have been proposed to overcome the above problem, including utilizing a magnifying telescope inside the substrate and non-parallel coupling directions. Even with these solutions, however, and even if only one reflecting surface is considered, the system thickness remains limited to a similar value. The FOV is limited by the diameter of the projection of the reflective surface 12 on the substrate plane. Mathematically, the maximum achievable FOV, due to this limitation, is expressed as:

$$FOV_{max} \approx \frac{T\tan\alpha_{sur} - d_{eye}}{R_{eye}}, \quad (3)$$

wherein $\alpha_{sur}$ is the angle between the reflecting surface and the normal to the substrate plane, and $R_{eye}$ is the distance between the eye of the viewer and the substrate (typically, about 30-40 mm).

Practically $\tan \alpha_{sur}$ cannot be much larger than 1; hence, for the same parameters described above for a FOV of 8°, the required substrate thickness here is of the order of 7 mm, which is an improvement on the previous limit. As the desired FOV is increased, nevertheless, the substrate thickness increases rapidly. For instance, for desired FOVs of 15° and 30° the substrate limiting thickness is 18 mm and 25 mm, respectively.

Figure 2:
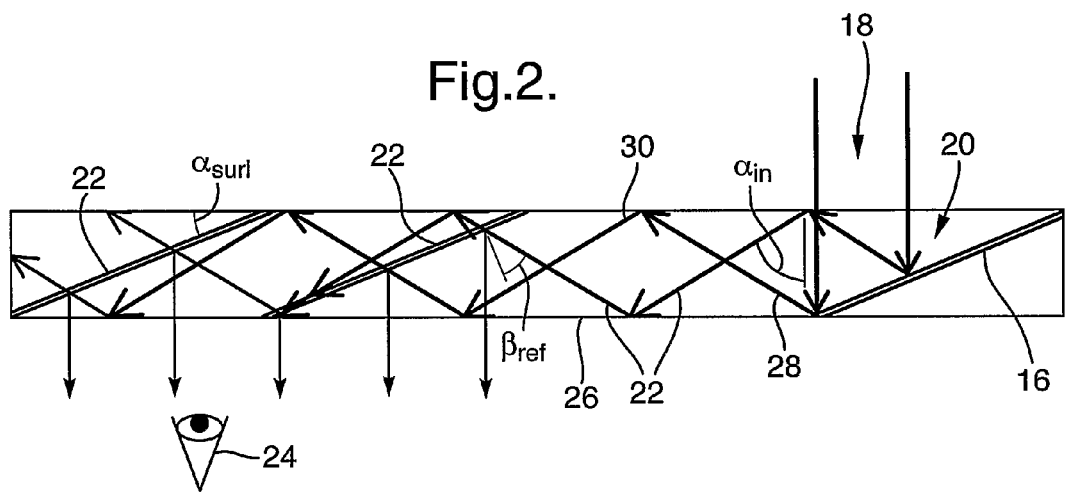

To alleviate the above limitations, the present invention utilizes an array of selectively reflecting surfaces, fabricated within a light-guide optical element (LOE). FIG. 2 illustrates a sectional view of an LOE according to the present invention. The first reflecting surface 16 is illuminated by a collimated display 18 emanating from a light source (not shown) located behind the device. The reflecting surface 16 reflects the incident light from the source such that the light is trapped inside a planar substrate 20 by total internal reflection. After several reflections off the surfaces of the substrate 20, the trapped waves reach an array of selectively reflecting surfaces 22, which couple the light out of the substrate into the eye 24 of a viewer. Assuming that the central wave of the source is coupled out of the substrate 20 in a direction normal to the substrate surface 26, and the off-axis angle of the coupled wave inside the substrate 20 is $\alpha_{in}$, then the angle $\alpha_{sur2}$ between the reflecting surfaces and the substrate plane is:

$$\alpha_{sur2} = \frac{\alpha_{in}}{2}. \qquad (4)$$

As can be seen in FIG. 2, the trapped rays arrive at the reflecting surfaces from two distinct directions 28, 30. In this particular embodiment, the trapped rays arrive at the reflecting surface from one of these directions 28 after an even number of reflections from the substrate surfaces 26, wherein the incident angle $\beta_{ref}$ between the trapped ray and the normal to the reflecting surface is:

$$\beta_{ref} = \alpha_{in} - \alpha_{sur2} = \frac{\alpha_{in}}{2}. \qquad (5)$$

The trapped rays arrive at the reflecting surface from the second direction 30 after an odd number of reflections from the substrate surfaces 26, where the off-axis angle is $\alpha'_{in} = 180° - \alpha_{in}$ and the incident angle between the trapped ray and the normal to the reflecting surface is:

$$\beta'_{ref} = \alpha'_{in} - \alpha_{sur2} = 180° - \alpha_{in} - \alpha_{sur2} = 180° - \frac{3\alpha_{in}}{2}. \qquad (6)$$

In order to prevent undesired reflections and ghost images, it is important that the reflectance be negligible for one of these two directions. The desired discrimination between the two incident directions can be achieved if one angle is significantly smaller than the other one. Fortunately, it is possible to design a coating with very low reflectance at high incident angles and a high reflectance for low incident angles. This property can be exploited to prevent undesired reflections and ghost images by eliminating the reflectance in one of the two directions. For example, choosing $\beta_{ref} \sim 25°$ from Equations (5) and (6) it can be calculated that:

$$\beta'_{ref} = 105°; \beta_{in} = 50°; \alpha_{in} = 130°; \alpha_{sur2} = 25°. \qquad (7)$$

Figure 3A:
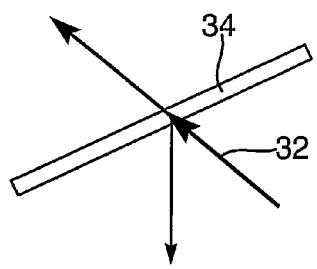
Figure 3B:
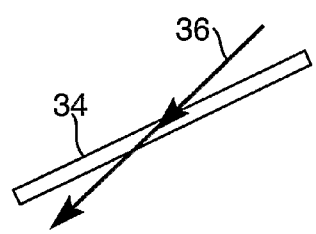

Now if a reflecting surface is determined for which $\beta'_{ref}$ is not reflected but $\alpha_{ref}$ is the desired condition is achieved. FIGS. 3A and 3B illustrate the desired reflectance behavior of selectively reflecting surfaces. While the ray 32 (FIG. 3A), having an off-axis angle of $\beta_{ref} \sim 25°$, is partially reflected and coupled out of the substrate 34, the ray 36 (FIG. 3B), which arrives at an off-axis angle of $\beta'_{ref} \sim 75°$ to the reflecting surface (which is equivalent to $\beta'_{ref} \sim 105°$), is transmitted through the reflecting surface 34 without any notable reflection.

FIGS. 4 and 5 show the reflectance curves of a dichroic coating designed to achieve the above reflectance characteristics for four different incident angles: 20°, 25°, 30° and 75°, with P-polarized and S-polarized light, respectively. While the reflectance of the high-angle ray is negligible over the entire relevant spectrum, the rays at off-axis angles of 20°, 25° and 30° obtain almost constant reflectance of 26%, 29% and 32% respectively for P-polarized light, and 32%, 28% and 25% respectively for S-polarized light, over the same spectrum. Evidently, reflectance decreases with the obliquity of the incident rays for P-polarized light and increases for S-polarized light.

Figure 6:
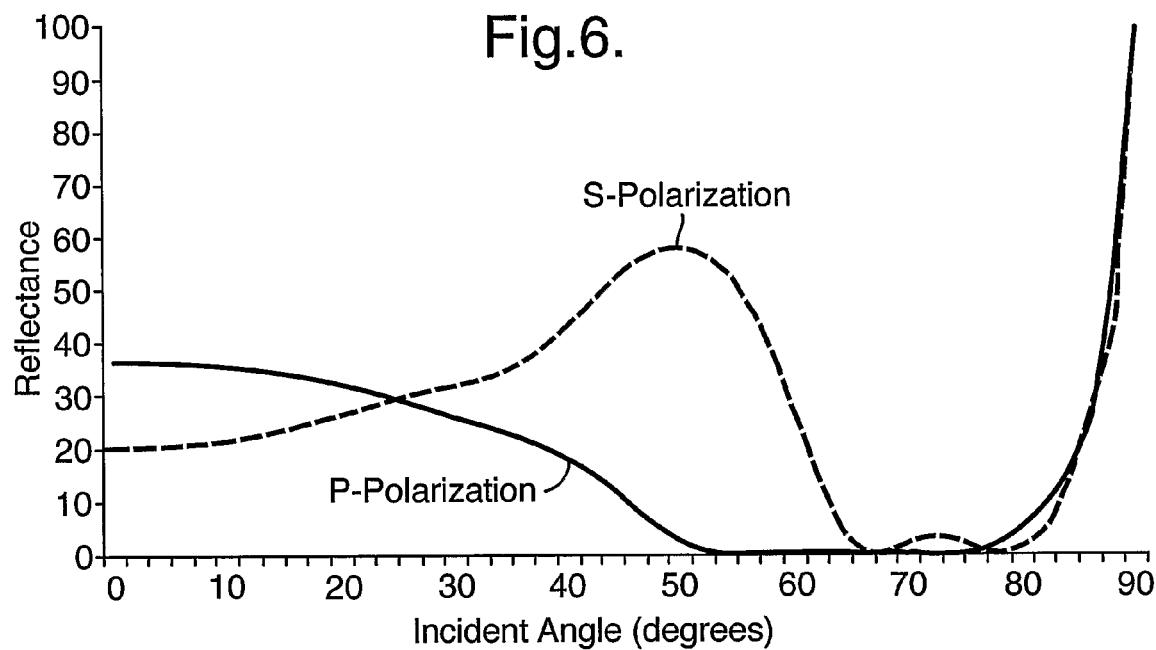

FIG. 6 illustrates the reflectance curves of the same dichroic coating, as a function of the incident angle for both polarizations at wavelength $\lambda = 550$ nm. Evidently, there are two significant regions in this graph: between 65° and 80° where the reflectance is very low, and between 15° and 40° where the reflectance changes monotonically with decreasing incident angles (increasing for P-polarized light and decreasing for S-polarized light). Hence, as long as the entire angular spectrum of $\beta'_{ref}$ where very low reflections are desired, will be located inside the first region, while the entire angular spectrum of $\beta_{ref}$ where higher reflections are required, will be located inside the second region, for a given FOV, then only one substrate mode will be reflected into the eye of the viewer and a ghost-free image will be achieved.

Apparently, there are some differences between the behaviors of the two polarizations. The main differences are that the region of high angles, where the reflectance is very low, is much narrower for the S-polarization, and that it is much more difficult to achieve a constant reflectance for a given angle over the entire spectral bandwidth for the S-polarized light than for the P-polarized light. Therefore, it is usually preferable to design the LOE for the P-polarized light only. This would be satisfactory for a system using a polarized display source, such as a liquid-crystal-display (LCD), or for a system where the output brightness is not crucial and the S-polarized light can be filtered out. However, for an unpolarized display source, like a CRT or an OLED, and where the brightness is critical, S-polarized light cannot be neglected and it must be addressed during the design procedure. Another difference is that the monotonic behavior of the S-polarized light at the angular spectrum of $\beta_{ref}$ where higher reflections are required, is opposite to that of the P-polarized light. That is, the reflectance for the S-polarized light increases with the obliquity of the incident rays. Apparently, this contradictory behavior of the two polarizations at the angular spectrum of $\beta_{ref}$ could be utilized during the optical design of the system to achieve the desired reflectance of the overall light according to the specific requirements of each system. It must be noted here that it is easier to design the required coating for S-polarized light than to design it for unpolarized light from the display source. Indeed, there are situations where the S-polarized light is preferable over the P-polarized light and coatings of the LOE should be designed accordingly.

The applications based on the LOE technology can serve in both see-through and non-see-through systems. In the former case, the LOE is semi-transparent to enable the viewing of the external scene through the LOE. In the latter case, opaque layers are located in front of the LOE. It is not necessary to occlude the entire LOE, typically only the active area where the display is visible, needs to be blocked. As such, the device can ensure that the peripheral vision of the user is maintained, replicating the viewing experience of a computer or a television screen, in which such peripheral vision serves an important cognitive function. Alternatively, a variable filter can be placed in front of the system in such a way that the viewer can control the brightness of the light emerging from the external scene. This variable filter could either be a mechanically controlled device such as a folding filter, two rotating polarizers, an electronically controlled device, or even an automatic device whereby the transmittance of the filter is determined by the brightness of the external background. One method to achieve the required variable transmittance filter is to use electrochromic materials in order to provide electrical control of optical transmittance, wherein materials with electrically controllable optical properties are incorporated into laminated structures.

In most cases, the reflectance of the first reflecting surface 16 (FIG. 2) should be as high as possible, so as to couple as much light as possible from the display source into the substrate. Assuming that the central wave of the source is normally incident onto the substrate, i.e., $\alpha_0 = 180°$, then the angle $\alpha_{sur1}$ between the first reflecting surface and the substrate plane is:

$$\alpha_{sur1} = \frac{\alpha_{in}}{2}; \alpha'_{sur1} = \frac{\alpha'_{in}}{2}. \tag{8}$$

The solutions for $\alpha_{sur1}$ and $\alpha'_{sur1}$ in the above example are 25° and 65°, respectively.

Figure 7:
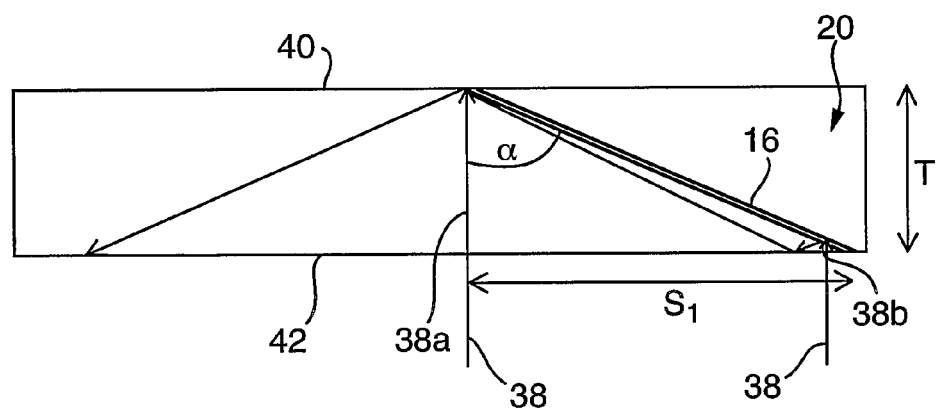

FIG. 7 presents a sectional view of the reflective surface 16, which is embedded inside the substrate 20 and couples light 38 from a display source (not shown) and traps it inside the substrate 20 by total internal reflection. As plotted here, the projection $S_1$ of the reflecting surface on the substrate surface 40 is:

$$S_1 = T \cdot \tan(\alpha), \tag{9}$$

where T is the substrate thickness. Apparently, the solution of $\alpha = \alpha'_{sur1}$ is preferred, since the coupling area on the substrate surface for the above example is more than 4.5 times larger than that for the previous solutions. A similar improvement ratio holds for other systems.

There are cases, particularly for non-see-through applications, however, where it is preferred that the first surface 16 would be a partially reflecting surface. That is, only part of the light from the display source is coupled into the substrate while the other part passes directly through the surface. Assuming, for instance, a system having the following parameters: $\alpha_{sur1} = 25°$, T=4 mm and $S_2$=27 mm, where $S_2$ is the required output aperture of the LOE to achieve the desired FOV and eye-motion-box. Apparently, at least three partially reflecting surfaces are required to achieve the necessary aperture. One method to achieve the required aperture is to couple all light from the source into the substrate using a totally reflecting surface 16 and then couple the light out using other three partially reflecting surface. Naturally, this method is essential for see-through systems where it is necessary that the partially reflecting surfaces will be also partially transmissive for the external view. However, for non-see-through systems, or for systems where only part of the output aperture should be partially transmissive, it is possible to exploit the first reflecting surface 16 as part of the output aperture.

Figure 8:
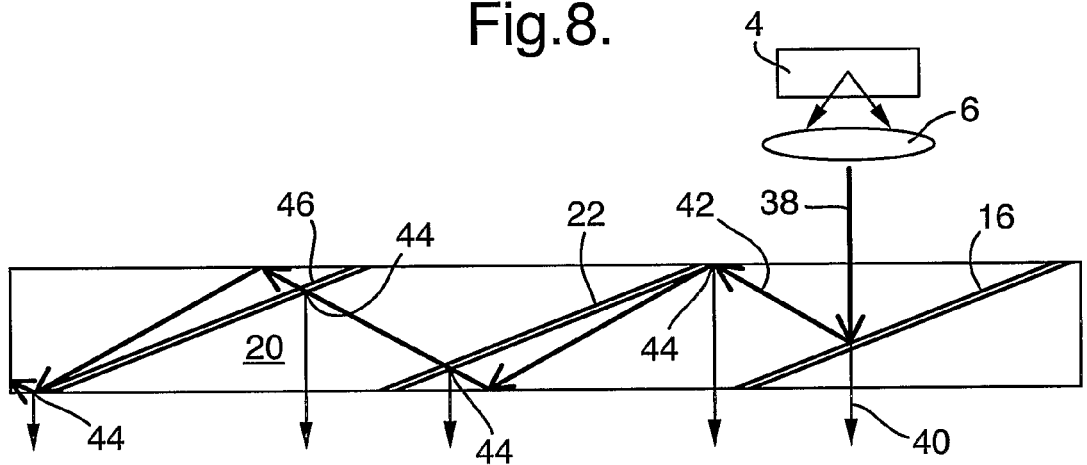
Figure 9:
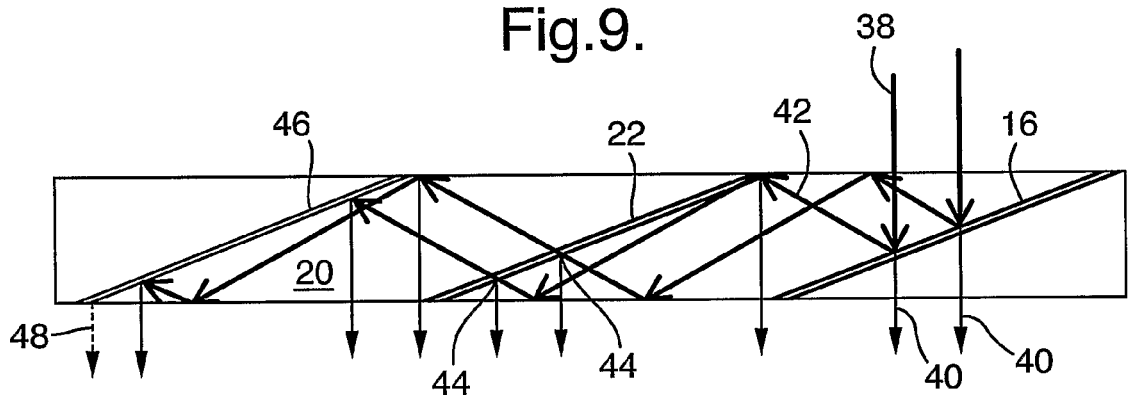

FIG. 8 is a detailed sectional view of an array of selectively reflective surfaces which couple light into a substrate, and then out into the eye of a viewer. As can be seen, a ray 38 from the light source 4 impinges on the first partially reflective surface. Part of the ray 40 continues with the original direction and is coupled out of the substrate. The other part of the ray 42 is coupled into the substrate by total internal reflection. The trapped ray is gradually coupled out from the substrate by the other two partially reflecting surfaces 22 at the points 44. The coating characteristics of the first reflecting surface 16 should not necessarily be similar to that of the other reflecting surfaces 22, 46. This coating can be a simpler beam-splitter, either metallic, dichroic or hybrid metallic-dichroic. Similarly, in a case of a non-see-through system, the last reflecting surface 46 can be a simple mirror. FIG. 9 is a detailed sectional view of an array of reflective surfaces wherein the last surface 46 is a total reflecting mirror. It is true that the extreme left part of the last reflecting surface 46 cannot be optically active in such a case, and the marginal rays 48 cannot be coupled out from the substrate. Hence, the output aperture of the device will be slightly smaller. However, the optical efficiency can be much higher and fabrication process of the LOE can be much simpler.

It is important to note that, unlike the configuration illustrated in FIG. 2, there is a constraint on the orientation of the reflective surfaces 16 and 22. In the former configuration all the light is coupled inside the substrate by the reflective surface 16. Hence, surface 16 need not be parallel to surfaces 22. Moreover, the reflecting surfaces might be oriented such that the light will be coupled out from the substrate in the opposite direction to that of the input waves. For the configuration illustrated in FIG. 8, however, part of the input light is not reflected by surface 16, but continues with its original direction and is immediately coupled-out from the substrate. Hence, to ensure that all the rays originating from the same plane wave will have the same output direction, it is not enough that all the reflecting surfaces 22 are parallel to each other, but surface 16 should be parallel to these surfaces as well.

FIG. 8 describes a system having two reflective surfaces for coupling the light out of the substrate, however, any number of reflective surfaces can be used according to the required output aperture of the optical system and the thickness of the substrate. Naturally, there are cases where only one coupling-out surface is required. In that case the output aperture will essentially be twice the size of the input aperture of the system. The only required reflecting surfaces for the last configuration are simple beam-splitters and mirrors.

Figure 10:
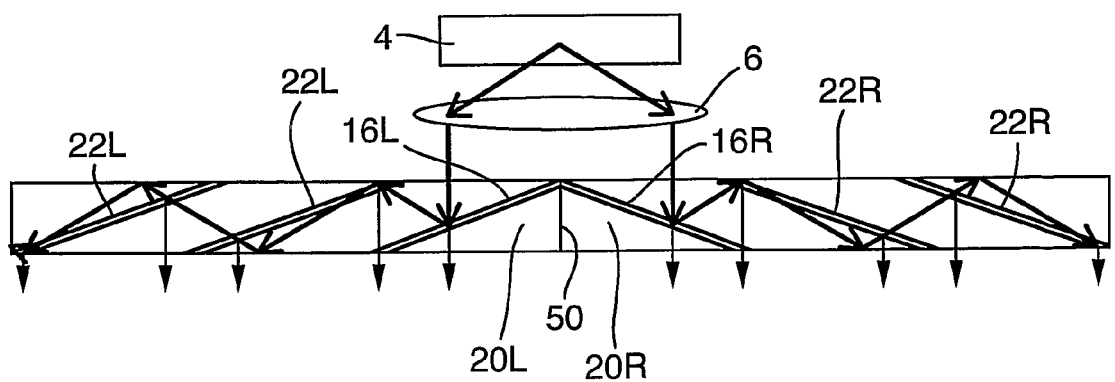

In the system described in FIG. 8, the light from the display source is coupled into the substrate at the end of the substrate, however, there are systems where it is preferred to have a symmetric system. That is, the input light should be coupled into the substrate at the central part of the substrate. FIG. 10 illustrates a method to combine two identical substrates, to produce a symmetric optical module. As can be seen, part of the light from the display source 4 passes directly through the partially reflecting surfaces out of the substrate. The other parts of the light are coupled into the right side of the substrate 20R and into the left side of the substrate 20L, by the partially reflecting surfaces 16R and 16L, respectively. The trapped light is then gradually coupled out by the reflecting surfaces 22R and 22L, respectively. Apparently, the output aperture is three times the size of the input aperture of the system, the same magnification as described in FIG. 8. However, unlike the system there, the system here is symmetric about the cemented surface 50 of the right and left substrates.

Figure 11:
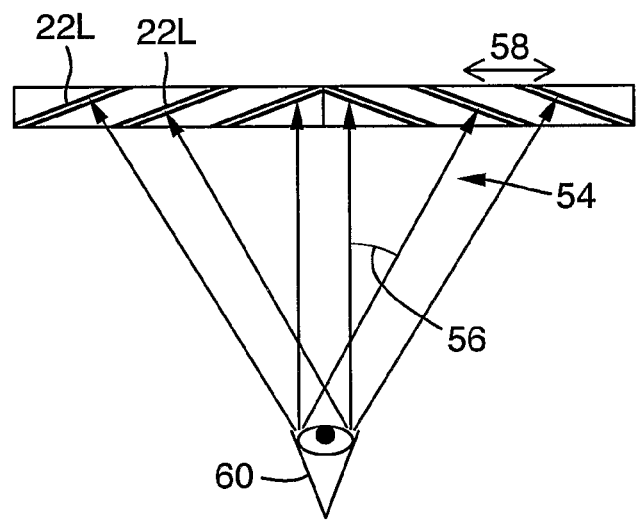

In addition to the preferable external shape of the optical system illustrated in FIG. 10, the symmetric configuration has other advantages over the system illustrated in FIG. 8. In considering the viewing angles, it is noted that different sections of the resulting image emerge from different areas of the partially reflecting surfaces. FIG. 11, which is a sectional view of a compact LOE display system based on the configuration of FIG. 10, illustrates this phenomenon. Here, a single plane wave 54, representing a particular viewing angle 56, emerges from the EMB 60 and illuminates only a part of the overall array of partially reflecting surfaces 22, as indicated by the double-headed arrows. Thus, for each point on the partially reflecting surface, a nominal viewing angle is defined, and the required reflectance can be designed according to this angle.

FIG. 12 illustrates how these viewing angles analysis can simplify the optical design of a symmetric LOE. Looking at the input plane wave 62, which emerges from the right side of the display source, it can be seen that only the right part of the wave 62R, which is partially coupled into the right LOE 20R, arrives at the EMB 60 of the system. In contrast, the left part of the wave 62L, which is partially coupled into the left LOE 20L, does not arrive at the EMB 60. Similarly, only the left part 64L of the wave 64, which is emerges from the left side of the display source arrives at the EMB, whereas the right side of the wave 64R does not.

There are two main consequences to this phenomenon. The first outcome is related to the structure of the LOE. Assuming that the required FOV angle inside the substrate is $\alpha_{FOV}$. Hence, for an asymmetrical LOE, as illustrated in FIG. 2, the maximal and the minimal angles of the trapped waves inside the LOE are $\alpha_0+\alpha_{FOV}/2$ and $\alpha_0-\alpha_{FOV}/2$ respectively. Therefore, the LOE should be designed to couple this angular range in and out. However, for the symmetric LOE illustrated in FIG. 12 it can be seen that for the right LOE 20R only the right part of the FOV is coupled into the EMB 60 of the system, while the left part of the FOV is coupled out of the EMB 60 and is not exploited by the viewer. Consequently, only the angular bandwidth between $\alpha_0-\alpha_{FOV}/2$ and $\alpha_0$, which is half of the original FOV, is utilized by the LOE 20R. Similarly, only the left part of the FOV is utilized by the left LOE 20L, and again, only the angular bandwidth between $\alpha_0++_{FOV}/2$ and $\alpha_0$, is exploited by the user here. Therefore, both parts of the LOE are identical elements that have to couple waves having a FOV of $\alpha_{FOV}/2$ in and out. The design and the fabrication procedures of these two parts are much easier than that for a single LOE, as illustrated in FIG. 2.

A similar consequence is related to the collimating lens 6. Since only the right half of the FOV is utilized by the right LOE 20R, it can be deduced that this is the only relevant part of the FOV for the right part of the collimating lens. Similarly, only the left part of the FOV is relevant to the left part of the collimating lens. Therefore, as can be seen if FIG. 13, instead of locating the exit pupil 66 of the collimating lens at the projection of the couple-in surface 16 on the lower surface 68 of the LOE 20, a much smaller exit pupil 70 can be located at the intersection plane of all the relevant marginal rays 72. Hence, a much simpler collimating lens can now be designed even for systems having a very wide FOV.

There are some considerations that must be taken into account during the fabrication process of the symmetric LOE. As can be seen in FIG. 14, the right LOE 20R and the left LOE 20L of the LOE 20 are joined together by cementing the two parts along the cementing surface 74. The easiest method for this fabrication process is to create two identical parts wherein the cementing plane is normal to the major surfaces of the LOE 20. There are some difficulties, however, with this fabrication method. Analyzing an input ray 76 which impinges on the LOE at an input angle $\alpha_0$ (inside the substrate), it is seen that part of the ray continues to propagate with the original direction 78, but another part of the ray 80 will be reflected by a Fresnel reflection from the interface plane between the substrate material and the cementing surface 74 at an angle $-\alpha_0$. Since the refractive index $v_s$ of the substrate material cannot be identical to the refractive index $v_c$ of the material, and since the ray 76 impinges on the cementing surface 74 at a very steep angle, a significant undesired reflection may occur even for a small refractive index deviation $\Delta v_{ind} = v_c - v_s$. The brightness of the undesired reflection is $$B'_S = B_{S_{in}} \cdot \left[\frac{\cos(\alpha_o)}{\cos(\alpha_i)}\right]^2; B'_P = B_{P_{in}} \cdot \left[\frac{\cot(\alpha_o)}{\cot(\alpha_i)}\right]^2, \quad (10)$$

where $B'_s$ and $B'_p$ denote the brightness of the reflected waves for an S- and P-polarized light respectively, and $\alpha_i$ is the angle inside the cement layer given by $$\cos(\alpha_i) = \cos(\alpha_o) \cdot \frac{v_c}{v_s}. \quad (11)$$

The rays are reflected twice: from the glass-cement and from the cement-glass interfaces. Hence, the actual brightness, for both polarizations, is given by $$B_a = 1 - (1 - B')^2. \quad (12)$$

For a thin substrate the width of the undesired reflected beam is $$d_{ref} = T \cdot \tan(\alpha_0), \quad (13)$$

This is usually smaller than the exit pupil diameter. Hence, the actual brightness that is seen by the eye of the viewer is $$B_{eye} = B_a \cdot \frac{d_{ref}}{d_{eye}} \cdot \frac{4}{\pi} = B_a \cdot \frac{4T \cdot \tan(\alpha_o)}{\pi \cdot d_{eye}}, \quad (14)$$

where $B_a$ and $B_{eye}$ are the actual brightness and the brightness seen by the eye of a viewer, respectively. Naturally, it is desired that $\Delta v_{ind}$ will be minimal. The most common glass material BK7, however, has a refractive index of $v_s=1.517$ (for the sake of simplicity, the term "refractive index" is hereafter related to the value at a wavelength of 588 nm), which is notably different from that of the common optical cement NOA-61 $v_c=1.564$).

Usually, in order to avoid disturbance of ghost images, it is required that the ratio $R_{gh}$ between the brightness of a ghost image and that of the primary image will be smaller than 0.02. For typical values of T=4 mm and $R_{eye}=4$ mm, the ghost image is $R_{gh}>0.02$ over the entire FOV of $\pm12°$ inside the substrate (or FOV$\pm18°$ in air), while for $2°<\alpha_0<8°$, there is even a ghost image of $R_{gh}>0.04$ for both polarizations.

A possible method to overcome the ghost image problem is illustrated in FIG. 15. Instead of assembling the LOE 20 of two identical parts, the LOE is assembled of two different parts, 82R and 82L, where the interface plane 84 between the part facets is inclined at an angle $\alpha_{cem}$ to the normal of the major surfaces of the LOE. Here, the input ray 86 is reflected by the surface 84 into a direction 88, which is not contained in the FOV of the image. Furthermore, the ray is coupled out of the EMB of the system and is not seen by the viewer. Still, there are some difficulties with this solution. Firstly, there is a necessity to manufacture two different facets, in order to assemble the LOE. In addition, both the manufacturing of the two facets and the assembly process are much more complicated than with the symmetric structure shown in FIG. 14.

An alternative method to solve the ghost image problem is to fabricate an LOE where the refractive index of the optical material of the substrate is very close to that of the optical cement used. This can be achieved by using an optical material having a similar refractive index to that of the optical cement NOA-61. Possible candidates are Schott N-BALF5 or N-PSK3 (among others) having refractive indices of 1.547 and 1.552, respectively. Alternatively, an optical cement having a diffractive index similar to that of BK7 can be used. A possible candidate for that is the cement NOA-65, which has a refractive index of 1.524. In the later case of using BK7 with NOA-65, the ghost image is $R_{gh}<0.02$ over the entire FOV of ±12° inside the substrate (or FOV±18° in the air) for both polarizations.

Thus far, only the FOV along the ξ axis has been discussed. The FOV along the orthogonal η axis should also be considered. The FOV along the η axis is not dependent upon the size or the number of the selectively reflecting surfaces, but rather on the lateral dimension along the η axis of the input waves coupled into the substrate. The maximum achievable FOV along the η axis is:

$$FOV_{max} \approx \frac{D_\eta - d_{eye}}{R_{eye} + l/(v\sin\alpha_{in})}, \quad (15)$$

wherein $D_\eta$ is the lateral dimension along η axis of the input waves coupled into the substrate. That is, if the desired FOV is 30°, then by using the same above-described parameters, the limiting lateral dimension is 42 mm. It was demonstrated that the longitudinal dimension along the ξ axis of the input waves coupled into the substrate is given by $S_1=T\tan(\alpha_{in})$. A substrate thickness of T=4 mm yields $S_1$=8.6 mm. Seemingly, the lateral extent of the LOE is five-fold larger than the longitudinal dimension. Even for an image aspect ratio of 4:3 (as with a standard video display) and a FOV in the η axis of 22°, the required lateral dimension is approximately 34 mm, still four-fold larger than the longitudinal dimension. This asymmetry is problematic since a collimating lens with a high numerical aperture, or a very large display source is required. With such values, it is impossible to achieve the desired compact system.

FIG. 16 illustrates an alternative method to expand the beam along two axes utilizing a double LOE configuration. The input wave 90 is coupled into the first LOE 20a, which has an asymmetrical structure similar to that illustrated in FIG. 2, by the first reflecting surface 16a and then propagates along the η axis. The partially reflecting surfaces 22a couple the light out of 20a and then the light is coupled into the second asymmetrical LOE 20b by the reflecting surface 16b. The light then propagates along the ξ axis and is then coupled out by the selectively reflecting surfaces 22b. As shown, the original beam 90 is expanded along both axes, where the overall expansion is determined by the ratio between the lateral dimensions of the elements 16a and 22b. The configuration given in FIG. 16 is just an example of a double-LOE setup. Other configurations in which two or more LOEs are combined together to form complicated optical systems are also possible.

Usually, the area where the light is coupled into the second LOE 20 by the surface 16b cannot be transparent to the external light and is not part of the see-through region. Hence, the first LOE 20b need not be transparent itself. As a result, it is usually possible to design the first LOE 20b to have a symmetric structure, as can be seen in FIG. 17, even for see-through systems. The second LOE 20b has an asymmetrical structure and it enables the user to see the external scene. In this configuration, part of the input beam 90 continues along the original direction 92 into the coupling-in mirror 16b of the second LOE 20b, while the other part 94 is coupled into the first LOE 20a by the reflecting surfaces 16a, propagates along the η axis and is then coupled into the second LOE 20b by the selectively reflecting surfaces 22a. Both parts are then coupled into the second asymmetrical LOE 20b by the reflecting surface 16b, propagate along the ξ axis, and are then coupled out by the selectively reflecting surfaces 22b.

In the case of non see-through systems, both LOEs may have a symmetrical structure, as can be seen in FIG. 18. In this double-symmetric configuration, part of the input beam 90 continues along the original direction 92 into the partially reflecting surfaces 16b of the second LOE 20b, while the other part 94 is coupled into the first LOE 20a by the partially reflecting surfaces 16a, propagates along the η axis and then impinges on the second LOE 20b at the area of the selectively reflecting surfaces 22a. Part of the light impinging on the second LOE 20b continues along its original direction 96 and is coupled out from the LOE 20b. The other part 98 is coupled into the second symmetrical LOE 20b by the reflecting surfaces 16b, propagates along the ξ axis, and is then coupled out by the selectively reflecting surfaces 22b.

FIGS. 17 and 18 illustrate optical embodiments for see-through and non see-through systems respectively. There are, however, intermediate applications where only part of the system aperture should have see-through capability. An example of such an application is a hand-held device for mobile application, such as for example, a cellular phone. These devices are expected to perform operations requiring the solution of a large screen, including videophone, Internet connection, access to electronic mail, and even the transmission of high-quality television satellite broadcasting. With the existing technologies, a small display could be embedded inside the phone, however, at present, such a display can project either video data of poor quality only, or a few lines of Internet or e-mail data directly into the eye.

FIG. 19 illustrates an alternative method, based on the present invention, which eliminates the current compromise between the small size of mobile devices and the desire to view digital content on a full format display, by projecting high quality images directly into the eye of the user. An optical module including the display source 4, the folding and collimating optics 6 and the substrate 20 is integrated into the body of a cellular phone 100, where the substrate 20 replaces the existing protective cover-window of the phone. Specifically, the volume of the support components including source 4 and optics 6 is sufficiently small to fit inside the acceptable volume for modern cellular devices. To, view the full screen transmitted by the device, the user positions the window in front of his eye 24, to conveniently view the image with high FOV, a large EMB and a comfortable eye-relief. It is also possible to view the entire FOV at a larger eye-relief by tilting the device to display different portions of the image. Furthermore, since the optical module can operate in see-through configuration, a dual operation of the device is possible, namely, it is optionally possible to maintain the conventional cellular LCD 102 intact. In this manner the standard, low-resolution display can be viewed through the LOE 20 when the display source 4 is shut-off. In a second virtual-mode, designated for e-mail reading, Internet surfing, or video operation, the conventional LCD 102 is shut-off while the display source 6 projects the required wide FOV image into the viewer's eye through the LOE 20. The embodiment described in FIG. 19 is only an example, illustrating that applications other than HMDs can be materialized. Other possible hand-carried arrangements include palm computers, small displays embedded into wristwatches, a pocket-carried display having the size and weight reminiscent of a credit card, and many more.

Apparently, there is much more information which is projected in the virtual-mode using the display source 4 and the LOE 20 than that displayed in the direct-view mode using the standard LCD 102. For that reason, and since it is desirable to utilize the virtual-mode display, having large EMB and eye-relief, it is usually required that the output aperture of the LOE be considerably larger than that required to see the conventional LCD 102. Hence, only part of the clear output aperture of the LOE should be transparent. Therefore, part of the LOE can be utilized to couple the light into the substrate as illustrated in FIG. 8. The embodiment for a partially see-through configuration is illustrated in FIG. 20. Here, part of the input beam 90 continues along the original direction 92 into the partially reflecting surface 16b of the second LOE 20b while the other part 94 is coupled into the first LOE 20a by the partially reflecting surfaces 16a, propagates along the η axis and then impinges on the second LOE 20b at the area of the selectively reflecting surface 22a. Part of the light, which impinges on the second LOE 20b continues along its original direction 96 and is coupled out of the LOE 20b. The other part 98 is coupled into the second asymmetrical LOE 20b by the reflecting surface 16b, propagates along the η axis, and is then coupled out by the selectively reflecting surfaces 22b.

FIG. 21 illustrates an embodiment of the present invention in which the LOEs 20a and 20b are embedded in an eyeglasses frame 107. The display source 4, and the folding and the collimating optics 6 are assembled inside the arm portions 112 of the eyeglasses frame, just next to LOE 20a, which is located at the edge of the LOE 20b. For a case in which the display source is an electronic element, such as a small CRT, LCD, or OLED, the driving electronics 114 for the display source might be assembled inside the back portion of the arm 112. A power supply and data interface 116 is connectable to arm 112 by a lead 118 or other communication means including radio or optical transmission. Alternatively, a battery and miniature data link electronics can be integrated in the eyeglasses frame. The embodiment described in FIG. 21 is only an example. Other possible head-mounted displays arrangements can be constructed, including assemblies where the display source is mounted parallel to the LOE plane, or in the upper part of the LOE.

For all of the configurations illustrated in FIGS. 16 to 18 and 20, the propagation directions of the central rays inside the LOEs 20a and 20b are oriented normal to each other. This is important when the polarization of the display source is considered. For an unpolarized display source, such as a CRT or an OLED, it is necessary to design the coating of both LOEs for both S- and P-polarizations. However, for a system using a polarized display source, such as an LCD, it will be sufficient to provide the coatings for a single polarization. In such a case, the coatings for one LOE will be determined for the S-polarized light and those for the second LOE would be determined for the other polarization. The decision, according to which polarization each LOE will be determined may be made according to the specific requirements of each system.

The embodiment described above is a mono-ocular optical system, that is, the image is projected onto a single eye. There are, however, applications, such as HUDs, wherein it is desired to project an image onto both eyes. Until recently, HUD systems have been used mainly in advanced combat fields and civilian aircraft. There have been numerous proposals and designs, of late, to install a HUD in front of a car driver in order to assist in driving navigation or to project a thermal image into the driver's eyes during low-visibility conditions. The existing systems are very expensive, large, heavy, and bulky, and too cumbersome for installation in a small aircraft let alone a car. LOE-based HUD potentially provides the possibilities for a very compact, self-contained HUD, that can be readily installed in confined spaces. It also simplifies the construction and manufacturing of the optical systems related to the HUD and therefore is a potentially suitable for both improving on aerospace HUD's, as well as introducing a compact, inexpensive, consumer version for the automotive industry.

FIG. 22 illustrates a method of materializing an HUD system based on the present invention. The light from a display source 4 is collimated by optics 6 to infinity and coupled by the first reflecting surface 16 into substrate 20. After reflection at a second reflecting array (not shown), the optical waves impinge on a third reflecting surfaces 22, which couples the light out into the eyes 24 of the viewer. The overall system can be very compact and lightweight, of the size of a large postcard having a thickness of a few millimeters. The display source, having a volume of a few cubic centimeters, can be attached to one of the corners of the substrate in an embodiment similar to that illustrated in FIG. 16, or to one of the sides of the substrate in an embodiment similar to that of FIG. 17, where an electric wire can transmit the power and data to the system. The installation of the HUD system should not be more complicated than the installation of a simple commercial audio system. Moreover, since there is no need for an external display source for image projection, the necessity to install components in unsafe places is avoided.

Since the EMB and the eye-relief of a typical HUD system are much larger than that of a head-mounted system, a considerable transparent margin would be required around the active area of the HUD so as to avoid intrusion of the external scene. Hence, the configuration illustrated in FIG. 20 will not be allowed for the HUD applications. That is, a transparent inert part 26 should be inserted between the couple-in reflecting surface 16b and the coupling-out reflecting surfaces 22b, as illustrated for example in FIG. 17.

Three different substrates, the coating of each being designed for one of the three basic colors, can be combined to produce a three-color display system. In that case, each substrate is transparent with respect to the other two colors. Such a system can be useful for applications in which a combination of three different monochromatic display-sources is required in order to create the final image. There are many other examples in which several substrates can be combined together to form a more complicated system.

In general, all the different configurations of the light-guide optical elements considered above, offer several important advantages over alternative compact optics for display applications, which include:

1) The input display source can be located very close to the substrate, so that the overall optical system is very compact and lightweight, offering an unparalleled form-factor.

2) In contrast to other compact display configurations, the present invention offers flexibility as to location of the input display source relative to the eyepiece. This flexibility, combined with the ability to locate the source close to the expanding substrate, alleviates the need to use an off-axis optical configuration that is common to other display systems. In addition, since the input aperture of the LOE is much smaller than the active area of the output aperture, the numerical aperture of the collimating optics is much smaller than required for a comparable conventional imaging system. Consequently a significantly more convenient optical system can be implemented and the many difficulties associated with off-axis optics and high numerical-aperture lenses, such as field or chromatic aberrations can be compensated for relatively easily and efficiently.

3) The reflectance coefficients of the selectively reflective surfaces in the present invention are essentially identical over the entire relevant spectrum. Hence, both monochromatic and polychromatic, light sources may be used as display sources. The LOE has a negligible wavelength-dependence ensuring high-quality color displays with high resolutions.

4) Since each point from the input display is transformed into a plane wave that is reflected into the eye of the viewer from a large part of the reflecting array, the tolerances on the exact location of the eye can be significantly relaxed. As such, the viewer can see the entire field-of-view, and the eye-motion-box can be significantly larger than in other compact display configurations.

5) Since a large part of the intensity from the display source is coupled into the substrate, and since a large portion of this coupled energy is "recycled" and coupled out into the eye of the viewer, a display of comparatively high brightness can be achieved even with display sources with low power consumption.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. An optical device, comprising:
   a light-transmitting substrate having at least two major surfaces parallel to each other and edges;
   optical means for coupling light into said substrate, and
   at least one selectively reflecting surface located in said substrate which is non-parallel to said major surfaces of the substrate and wherein said optical means for coupling light into said substrate is a partially reflecting surface, wherein part of the light coupled into the substrate passes through the partially reflecting surface out of said substrate and part of said light is reflected into the substrate by one of the major surfaces and further reflected at least once by total internal reflection and coupled out of the substrate by the selectively reflecting surface after reflection off at least one of the major surfaces of the substrate.

2. The optical device according to claim 1, wherein said optical means is located in said substrate.

3. The optical device according to claim 2, wherein said partially reflecting surface is parallel to said at least one reflecting surface.

4. The optical device according to claim 1, wherein said at least one reflecting surface is a partially reflecting surface.

5. The optical device according to claim 1, wherein said optical means for coupling light into said substrate is disposed at an angle to said major surfaces to cause at least part of the rays of said coupled light to intersect said at least one reflecting surface at least twice with two different incident angles.

6. The optical device according to claim 1, wherein rays of said coupled light impinge on one side of the partially reflecting surface at a first angle of incidence and rays of said coupled light impinge on a second side of said partially reflecting surface at a second smaller angle of incidence.

7. The optical device according to claim 1, wherein said partially reflecting surface has a small reflection for one part of the angular spectrum and a larger reflection for other parts of the angular spectrum.

8. The optical device according to claim 7, wherein said at least one reflecting surface has a low reflectance at high incident angles and a high reflectance at low incident angles.

9. The optical device according to claim 6, wherein said at least one reflecting surface has a small reflection for one of said incident angles and a significantly larger reflection for the second of said incident angles.

10. The optical device according to claim 6, wherein said one incident angle having, small reflectance is larger than said second incident angle.

11. The optical device according to claim 1, wherein said at least one reflecting surface is a totally reflecting mirror.

12. The optical device according to claim 1, wherein said partially reflecting surface having a coating for P-polarized light.

13. The optical device according to claim 1, wherein said partially-reflecting surface having a coating for an S-polarized light.

14. The optical device according to claim 1, wherein said at least one reflecting surface having a coating for an unpolarized light.

15. The optical device according to claim 1, wherein said at least one reflecting surface having a coating for P-polarized light.

16. The optical device according to claim 1, wherein said at least one reflecting surface having a coating for an S-polarized light.

17. The optical device according to claim 1, wherein said partially reflecting surface having a coating for an unpolarized light.

18. The optical device according to claim 4, wherein said at least one partially reflecting surface couples the light trapped by internal reflection out of said substrate.

19. The optical device according to claim 18, wherein said at least one partially reflecting surface is disposed at an angle calculated to cause an entire pre-defined image to reach the eyes of an observer.

20. The optical device according to claim 1, wherein there is provided an array of two or more reflecting surfaces characterized in that said partially reflecting surfaces are parallel to each other and are non-parallel to any of the edges of said major surfaces of the substrate.

21. The optical device according to claim 20, wherein said reflecting surfaces are parallel to said optical means.

22. The optical device according to claim 20, wherein at least one of said array of reflecting surfaces is a totally reflecting mirror.

23. The optical device according to claim 20, wherein at least one of said array of reflecting surfaces is a partially reflecting mirror.

24. The optical device according to claim 1, further comprising at least one other optical device, including a light-transmitting substrate having at least two major surfaces parallel to each other and edges; optical means for coupling light into said substrate by internal reflection located in said substrate and at least one reflecting surface located in said substrate which is non-parallel to said major surfaces of the substrate, wherein said two substrates are in contact with each other.

25. The optical device according to claim 24, wherein the location and orientation of said at least two substrates is selected to control the input aperture for a given field of view.

26. The optical device according to claim 24, wherein the reflectance of the partially reflecting surfaces which are located in said at least two substrates is selected to control the brightness across the field of view.

27. The optical device according to claim 24, wherein said two different substrates are combined to form a symmetrical structure.

28. The optical device according to claim 27, wherein said symmetrical structure is comprised of two identical substrates.

29. The optical device according to claim 27, wherein said symmetrical structure is comprised of two different substrates.

30. The optical device according to claim 27, wherein said two different substrates are cemented together using an optical cement having a refractive index at least similar to that of said substrates.

31. The optical device according to claim 24, wherein at least one of said substrates has a symmetrical structure.

32. The optical device according to claim 24, wherein two of said substrates have a symmetrical structure.

33. The optical device according to claim 1, wherein said substrate is partially transparent, to enable see-through viewing.

34. The optical device according to claim 1, further comprising an opaque surface located on or in said substrate, so as to block the entrance of light traversing the substrate from an external scene.

35. The optical device according to claim 1, further comprising a variable transmittance surface located so as to attenuate the entrance of light traversing the substrate, for controlling the brightness of light passing through said device from an external scene.

36. The optical device according to claim 35, wherein the transmittance of said variable transmittance surface is automatically determined according to the brightness of light directed to traverse the substrate.

37. The optical device according to claim 1, wherein said at least one partially reflecting surface reflects trapped waves into a direction calculated to reach both eyes of an observer.

38. The optical device according to claim 1, wherein said device is mounted in an eyeglasses frame.

39. The optical device according to claim 1, wherein said device is located in a mobile communication device.

* * * * *

UNITED STATES PATENT AND TRADEMARK OFFICE
CERTIFICATE OF CORRECTION

PATENT NO. : 7,643,214 B2
APPLICATION NO. : 11/570587
DATED : January 5, 2010
INVENTOR(S) : Yaakov Amitai It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 80 days.

Signed and Sealed this

Sixteenth Day of November, 2010

David J. Kappos
*Director of the United States Patent and Trademark Office*